United States Patent
Jang et al.

(10) Patent No.: US 7,630,030 B2
(45) Date of Patent: Dec. 8, 2009

(54) LCD DEVICE COMPRISING A POLARIZING DOMAIN OF A POLARIZING SHEET HAVING A TRANSMISSION ANGLE THAT IS THE SAME AS THE LIQUID CRYSTAL ALIGNMENT ANGLE OF THE CORRESPONDING ALIGNMENT DOMAIN OF A PIXEL

(75) Inventors: Mi Kyoung Jang, Pusan-Kwangyokshi (KR); Ju Han Kim, Daegu-kwangyokshi (KR); Hyeok Soo Kim, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 527 days.

(21) Appl. No.: 11/168,456

(22) Filed: Jun. 29, 2005

(65) Prior Publication Data

US 2006/0001798 A1    Jan. 5, 2006

(30) Foreign Application Priority Data

Jun. 30, 2004    (KR) ...................... 10-2004-0050384

(51) Int. Cl.
*G02F 1/1335* (2006.01)
*G02F 1/1337* (2006.01)

(52) U.S. Cl. ......................................... 349/96; 349/129

(58) Field of Classification Search .................... 349/96
See application file for complete search history.

(56) References Cited

U.S. PATENT DOCUMENTS

| | | | | |
|---|---|---|---|---|
| 5,434,687 A | * | 7/1995 | Kawata et al. ................ 349/96 |
| 6,061,043 A | * | 5/2000 | Bonnett et al. ................ 345/89 |
| 6,348,957 B1 | * | 2/2002 | Yamazaki et al. ............. 349/15 |
| 6,593,987 B1 | * | 7/2003 | Walton et al. ............... 349/129 |
| 2002/0063827 A1 | * | 5/2002 | Wu ............................ 349/117 |
| 2002/0191136 A1 | * | 12/2002 | Yoneya et al. ............... 349/123 |
| 2004/0008298 A1 | * | 1/2004 | Kwok et al. .................. 349/96 |
| 2005/0146664 A1 | * | 7/2005 | Hanaoka et al. ............. 349/130 |
| 2005/0225706 A1 | * | 10/2005 | Miyachi et al. ............. 349/117 |

FOREIGN PATENT DOCUMENTS

| | | |
|---|---|---|
| JP | 11-352487 | 12/1999 |
| JP | 2003-207641 | 7/2003 |
| JP | 2004-109171 | 4/2004 |
| WO | WO 96/10771 | 4/1996 |

* cited by examiner

*Primary Examiner*—Michael H Caley
*Assistant Examiner*—Charles Chang
(74) *Attorney, Agent, or Firm*—McKenna Long & Aldridge (57) ABSTRACT

Disclosed is an LCD device and a method for fabricating the same is disclosed, which maximizes light efficiency by compensating for light transmissivity resulting from the alignment of the liquid crystal in a plurality of alignment domains within a pixel region. Compensation is accomplished by a polarizing sheet having a plurality of polarizing regions corresponding to the alignment domains, wherein each polarizing region has a transmission angle that corresponds to the alignment angle of the corresponding domain so that light leakage in a black state can be minimized.

9 Claims, 5 Drawing Sheets

LCD DEVICE COMPRISING A POLARIZING DOMAIN OF A POLARIZING SHEET HAVING A TRANSMISSION ANGLE THAT IS THE SAME AS THE LIQUID CRYSTAL ALIGNMENT ANGLE OF THE CORRESPONDING ALIGNMENT DOMAIN OF A PIXEL

The present invention claims the benefit of Korean Application No. P2004-50384, filed on Jun. 30, 2004, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device and a method for fabricating the same, that maximizes light efficiency by compensating for the light transmissivity of each liquid crystal alignment domain of each pixel.

2. Discussion of the Related Art

The rise of the global information society has increased the demand for various display devices. Accordingly, many efforts have been made to research and develop various flat display devices such as liquid crystal display (LCD), plasma display panel (PDP), electroluminescent display (ELD), and vacuum fluorescent display (VFD). Different types of flat display devices have been developed as displays for various equipment.

Among the various flat display devices, liquid crystal display (LCD) devices have been most widely used due to advantageous characteristics of thin profile, lightness in weight, and low power consumption, making them an attractive substitute for Cathode Ray Tube (CRT) displays. In addition to mobile-type LCD devices for use in notebook computers, LCD devices have been developed for uses such as computer monitors and televisions.

Despite various technical developments in LCD technology having applications in different fields, research in enhancing the picture quality of the LCD device has been, in some respects, lacking as compared to other features and advantages of the LCD device. In order to use LCD devices in various fields as a general display, the key to developing LCD devices depends on whether LCD devices can provide a high quality picture, such as high resolution and high luminance with a large-sized screen, while still maintaining lightness in weight, thin profile, and low power consumption.

In general, an LCD device includes an LCD panel for displaying an image, and a driver for supplying a driving signal to the LCD panel. The LCD panel includes a first substrate and second substrate bonded to each other with a cell gap between them, and a liquid crystal layer formed between the first and second substrates.

The first substrate (TFT array substrate) includes a plurality of gate lines arranged along a first direction at a fixed interval; a plurality of data lines arranged along a second direction perpendicular to the first direction and at a fixed interval; a plurality of pixel electrodes arranged in a matrix-type configuration within pixel regions defined by the crossing of the gate and data lines; and a plurality of thin film transistors that apply video-signal voltages on the data lines to the pixel electrodes in response to gate signals on the gate lines.

The second substrate (color filter array substrate) includes a black matrix layer that blocks light from portions of the first substrate other than the pixel regions, an R/G/B color filter layer for displaying various colors, and a common electrode for producing the image.

The LCD device is driven according to the optical anisotropy and polarizing characteristics of the liquid crystal material. Liquid crystal molecules are aligned according to directional characteristics due to the liquid crystal molecules' long and thin shape. The alignment direction of the liquid crystal molecules of the liquid crystal layer is controlled by applying an electric field. Accordingly, light transmitted through the liquid crystal layer may be controlled by the alignment direction of the liquid crystal molecules, thereby displaying the image.

Active matrix-type LCD devices have been developed because of their high resolution and image quality, wherein the pixel electrodes are connected to the thin film transistors and are arranged in a matrix-type configuration.

A related art LCD device and a method for fabricating the same will be described with reference to the accompanying drawings.

Figure 1:
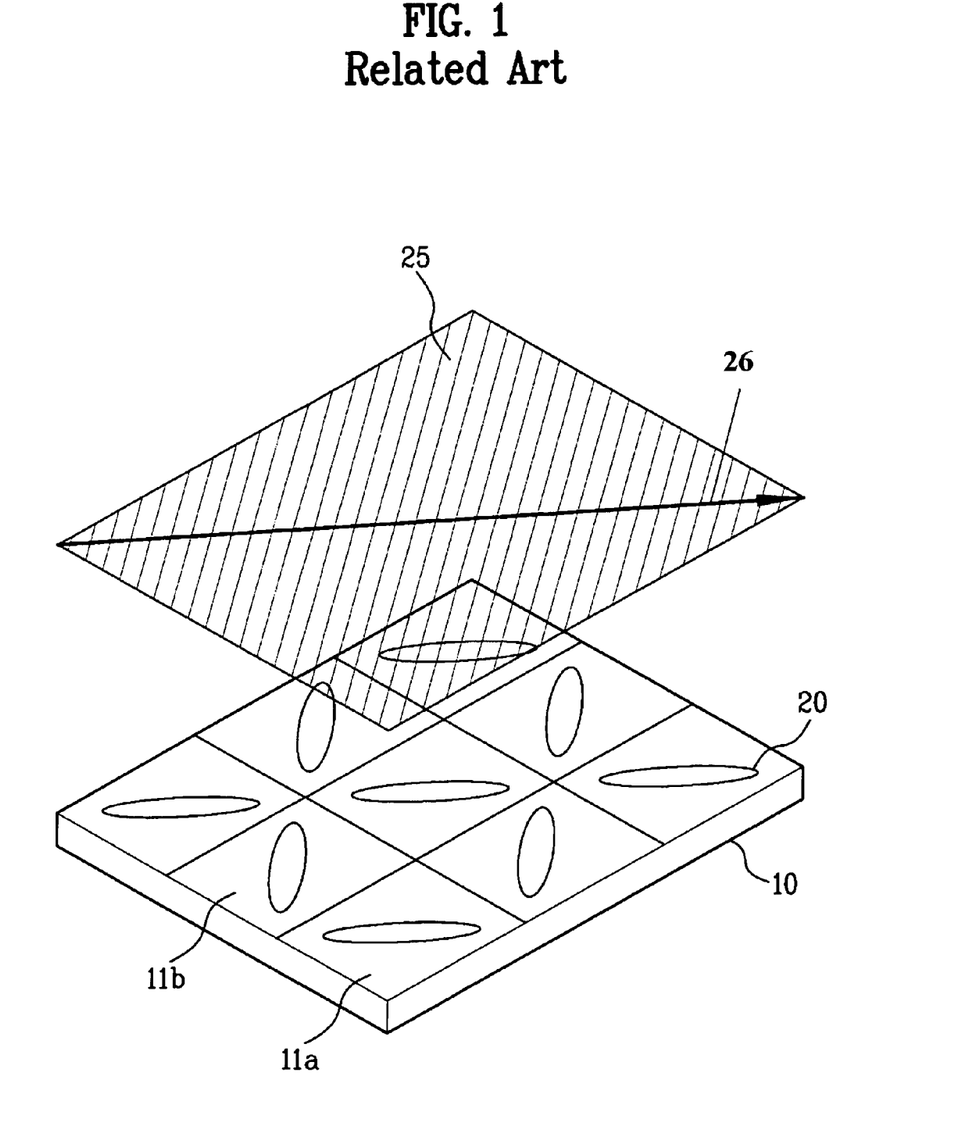
FIG. 1 is a perspective view of an LCD panel and a corresponding polarizing sheet in a multi-domain LCD device according to the related art.
Figure 2:
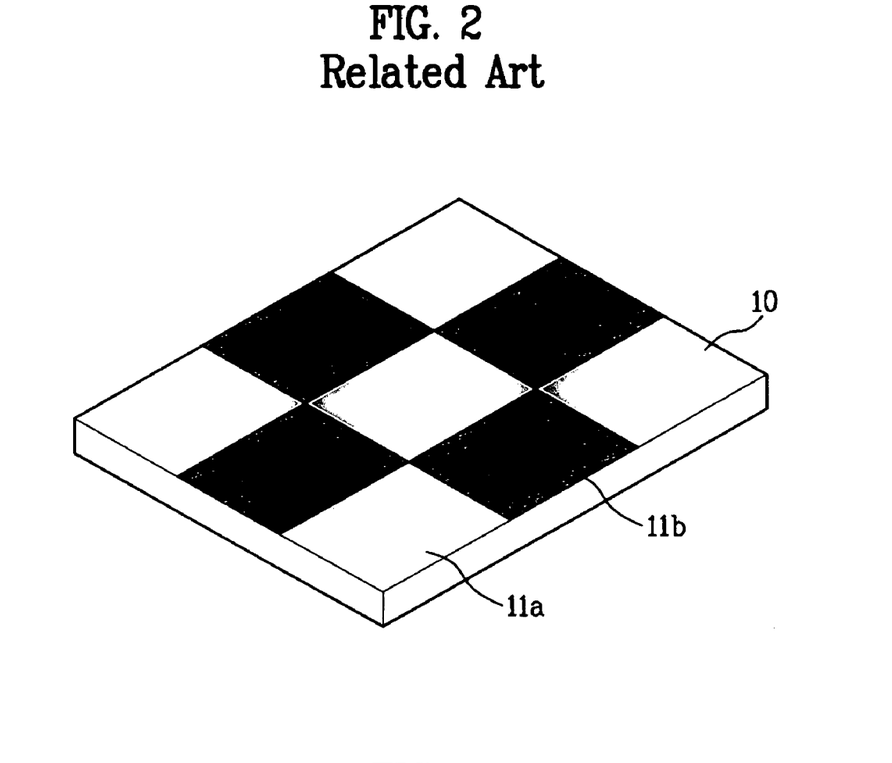
FIG. 2 illustrates a distribution of luminance by each domain in an LCD device of FIG. 1.

FIG. 1 is a perspective view illustrating an LCD panel and a corresponding polarizing sheet in a multi-domain LCD device according to the related art. FIG. 2 illustrates an expected luminance distribution in each domain of an LCD device of FIG. 1.

As illustrated in FIG. 1 and FIG. 2, a related art multi-domain LCD device includes an LCD panel 10 and a polarizing sheet 25. The LCD panel 10 includes a plurality of pixel regions, each pixel region having a plurality of domains. In the polarizing sheet 25, a light-transmitting axis 26 is defined in one direction. The LCD panel includes first and second substrates opposite each other, and a liquid crystal layer 20 formed between the first and second substrates.

The polarizing sheet 25 is adhered to the outer surface of each of the first and second substrates. One polarizing sheet 25 having a light-transmitting axis 26 is formed on an upper surface of the LCD panel 10, and another polarizing sheet (not shown) having a light-transmitting axis is formed on a lower surface of the LCD panel 10. The light-transmitting axes of the polarizing sheets are formed at an angle of about 90° (or a predetermined angle) relative to each other.

After completing the array fabrication processes for the first and second substrates in the multi-domain LCD device according to the related art, a pretilt angle may be selectively applied to each domain by rubbing each of first and second alignment layers (not shown). Alternatively, in the array process, one pixel region may be divided into the plurality of domains through the design of the pixel electrode or common electrode in the pixel region of each of the first and second substrates.

FIG. 1 illustrates one pixel region with nine domains. In this case, the adjacent domains have the different alignment directions from one another, of which two may be referred to as a first domain 11a and a second domain 11b.

Referring to FIG. 2, in the first domain 11a, the liquid crystal is aligned in the same direction as the light-transmitting axis 26 of the polarizing sheet 25. Accordingly, the light transmission in the first domain 11a is greater than the light transmission in the other domains. For the second domain 11b, the liquid crystal is aligned at the angle between 0° and 90° relative to the light-transmitting axis 26 of the polarizing sheet 25. That is, light transmission in the second domain 11b is relatively less than the light transmission in the first domain 11a. As a result, light leaks out from the first domain 11a in a black state.

Generally, the polarizing sheets are positioned on the lower and upper surfaces of the LCD panel. The light-transmitting axes of the two polarizing sheets may be positioned in parallel or at a relative angle of about 90°.

In case of a multi-domain LCD device having a plurality of pixel regions, and wherein each pixel region has a plurality of domains, the viewing angle is improved in the horizontal and vertical directions. However, it is difficult to improve the viewing angle in the diagonal direction. Accordingly, light leakage may be generated in the predetermined domain of the multi-domain LCD device, so that it is difficult to obtain the uniform light transmissivity.

An HAVA (high aperture vertical alignment) mode LCD device, which is a type of multi-domain LCD device, will be described as follows.

Figure 3:
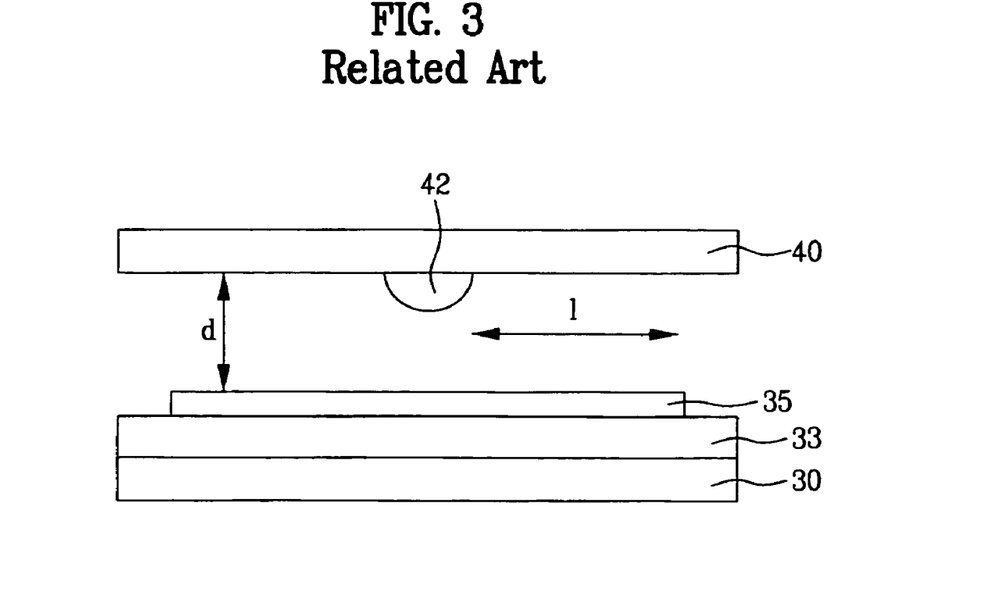
FIG. 3 is a cross sectional view of a related art HAVA mode LCD device.
Figure 4:
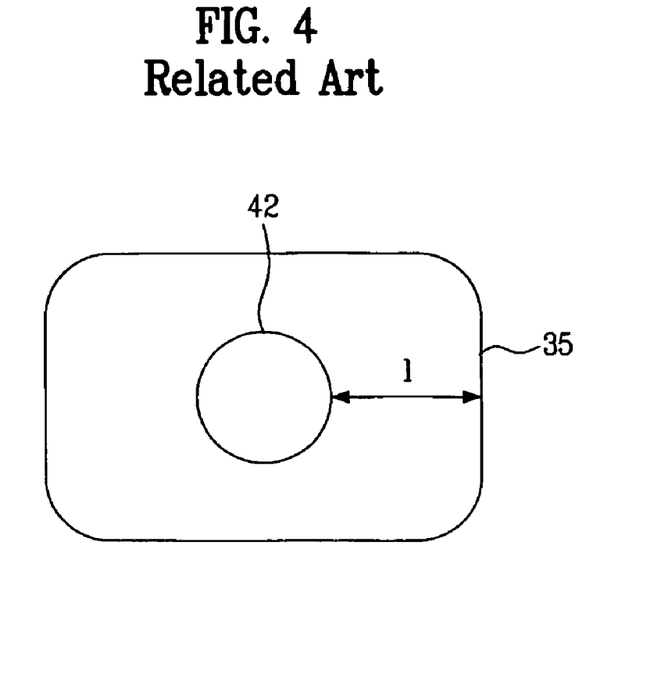
FIG. 4 is a plan view of the related art HAVA mode LCD device of FIG. 3.
Figure 5:
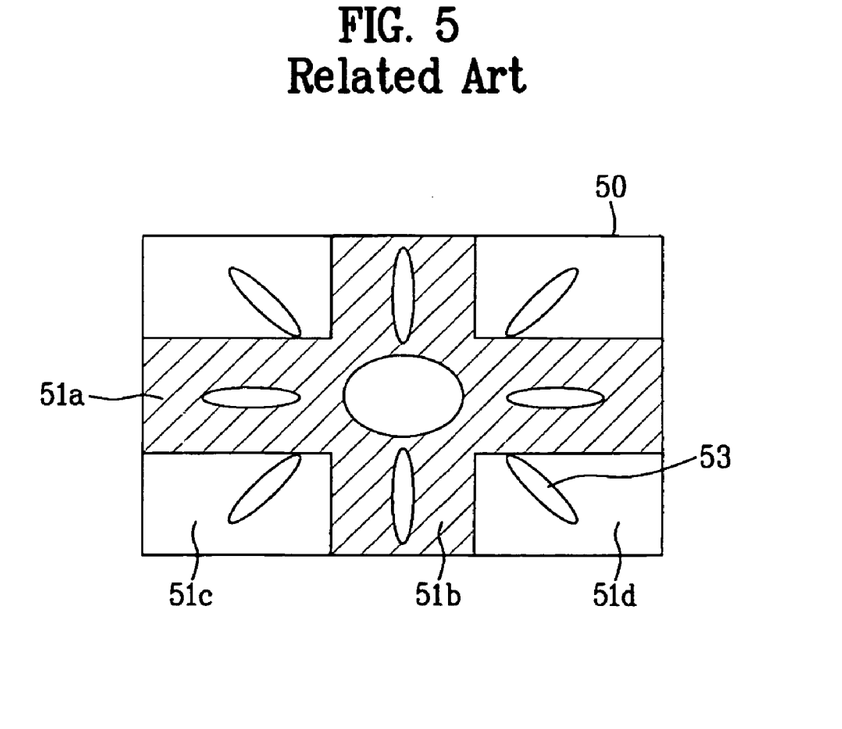
FIG. 5 is a plan view illustrating the alignment of liquid crystal of FIG. 4.

FIG. 3 is a cross sectional view of a high aperture vertical alignment HAVA mode LCD device according to the related art. FIG. 4 is a plan view of an HAVA mode LCD device according to the related art. FIG. 5 shows the alignment of liquid crystal in an HAVA mode LCD device of FIG. 4.

As illustrated in FIGS. 3-5, a related art HAVA mode LCD device includes first and second substrates 30 and 40, gate and data lines (not shown), a pixel electrode 35 and a dielectric protrusion 42. The first and second substrates 30 and 40 are positioned opposite each other. The gate lines (not shown) cross the data lines (not shown) at right angles, to define a pixel region. The pixel electrode 35 is formed on the pixel region of the first substrate 30. The dielectric protrusion 42 is formed on the second substrate 40 corresponding to with the center of the pixel region. In addition, an insulating layer 33 is formed between the gate line and the data line, between the gate line and the pixel electrode, and between the data line and the pixel electrode.

Further, a common electrode (not shown) is formed on an entire surface of the second substrate 40. On applying a voltage, a vertical electric field is formed between the pixel electrode 35 and the common electrode (not shown). A cell gap "d" is formed between opposite surfaces of the first and second substrates 30 and 40, and distance "I" defines the distance in a straight line between one side of the pixel electrode 35 and one outermost point of the dielectric protrusion 42.

In a HAVA mode LCD device, polarizing sheets are positioned on the rear surfaces of the first and second substrates 30 and 40.

Referring to FIG. 5, the dielectric protrusion 42 is formed corresponding to the center of the pixel region 50 in the HAVA mode LCD device. Accordingly, an electric field is formed in a radial direction from the dielectric protrusion 42, whereby the liquid crystal 53 is aligned in a radial direction according to the electric field.

As illustrated in FIG. 5, the unit pixel region is divided into a first domain 51a, a second domain 51b, a third domain 51c and a fourth domain 51d. In the first domain 51a, the liquid crystal is aligned in the horizontal direction. In the second domain 51b, the liquid crystal is aligned in the vertical direction. In the third domain 51c, the liquid crystal is aligned in a diagonal direction crossing from the lower left corner to the upper right corner. In the fourth domain 51d, the liquid crystal is aligned in a diagonal direction crossing from the lower right corner to the upper left corner.

The HAVA mode LCD device compensates for the liquid crystal aligned in the horizontal and vertical direction. That is, on applying a voltage to the HAVA mode LCD device, light leakage occurs at four corners of the pixel region (e.g., domains 51c and 51d), thereby deteriorating image contrast.

If the light-transmitting axes of the lower and upper polarizing sheets are twisted at an angle of 45°, the light leakage may be generated in the domains of liquid crystal aligned in the horizontal and vertical directions (e.g., domains 51a and 51b). To obtain the high aperture ratio in the multi-domain HAVA mode LCD device, even if the alignment process is performed in the pixel region of the LCD panel to obtain the various directions on alignment of liquid crystal, a light leakage may occur in certain domains, depending on the light-transmitting axis of the polarizing sheet.

Accordingly, related art LCD devices and method for fabricating them have the following disadvantages.

To obtain a high aperture ratio in the multi-domain LCD device including the HAVA mode of the related art, even if the alignment process is performed in the pixel region of the LCD panel to obtain the various directions on alignment of liquid crystal, the luminance differs by domain according to whether the liquid crystal of that domain is aligned in the same or different direction as the light-transmitting axis of the polarizing sheet. That is, the light leakage may occur in the black state, whereby the differences in luminance may be generated in the domains of one pixel region.

SUMMARY OF THE INVENTION

Accordingly, the present invention is directed to an LCD device and a method for fabricating the same that substantially obviates one or more of the aforementioned problems due to limitations and disadvantages of the related art. In general, the present invention achieves this by providing a polarizing sheet or compensation film that individually compensates for each liquid crystal alignment domain within a given pixel region.

An advantage of the present invention is that it improves light efficiency of a liquid crystal display device.

Another advantage of the present invention is that it improves the contrast of an image displayed by a liquid crystal display device.

Additional advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

The aforementioned and other advantages of the present invention are achieved with an LCD device, which comprises an LCD panel having a plurality of pixels, wherein each pixel has a plurality of alignment domains, and each alignment domain has a liquid crystal alignment angle; and a polarizing sheet disposed on a surface of the LCD panel, wherein the polarizing sheet has a plurality of polarizing domains corresponding to the plurality of alignment domains.

In another aspect of the present invention, the aforementioned and other advantages are achieved by a method for fabricating an LCD device, which comprises providing a first substrate and a second substrate; forming a plurality of pixels on the first substrate and the second substrate, wherein each pixel has an alignment domain and wherein at least two alignment domains have different alignment characteristics; forming a liquid crystal layer between the first and second substrates to form an LCD panel; and forming a polarizing sheet on a surface of the LCD panel, the polarizing sheet having a plurality of polarizing domains corresponding to the plurality of alignment domains.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts. Hereinafter, an LCD device and a method for fabricating the same according to the present invention will be described with reference to the accompanying drawings.

Figure 6:
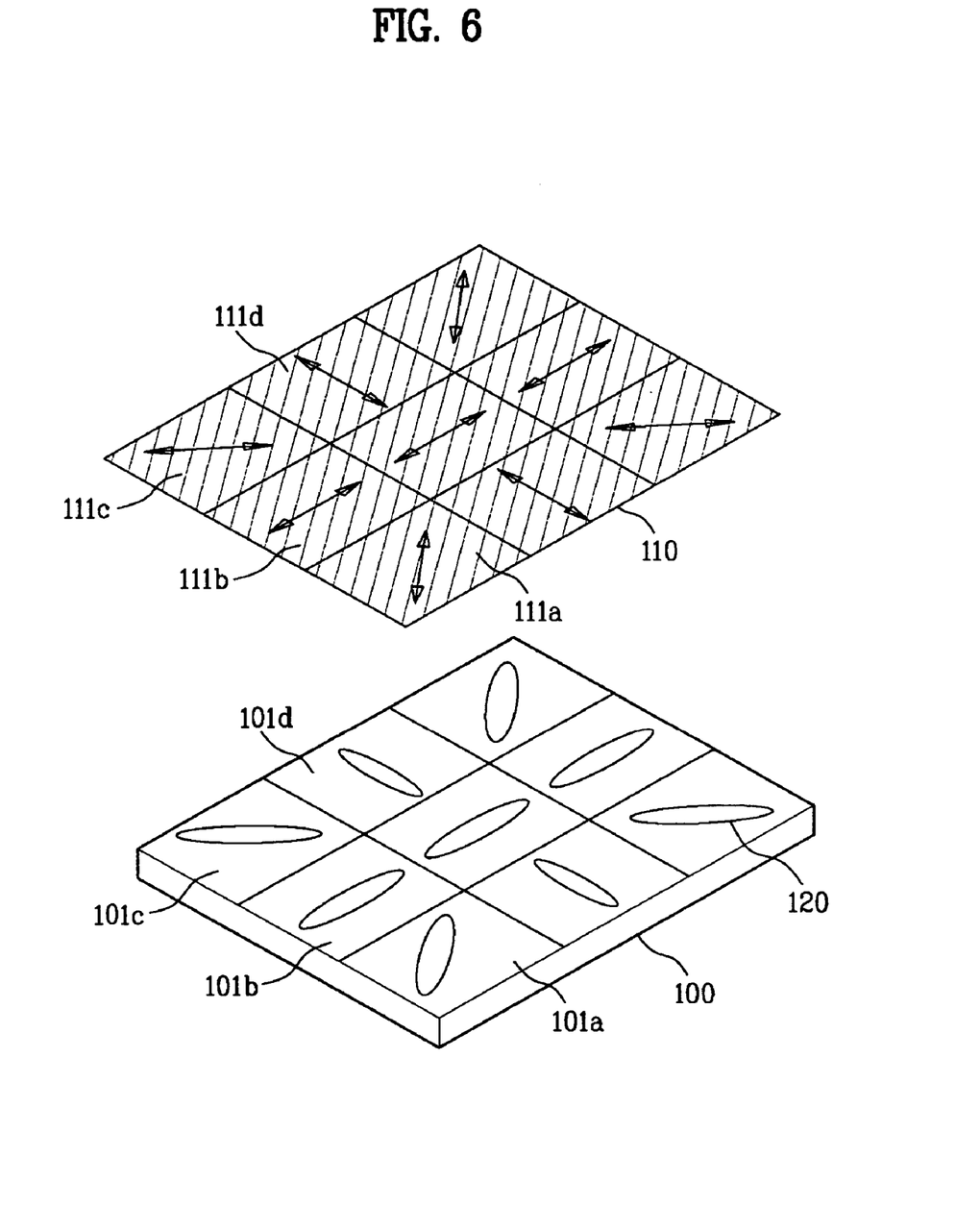
FIG. 6 is a perspective view of an LCD panel and a corresponding polarizing sheet in an exemplary LCD device according to a first embodiment of the present invention.

FIG. 6 is a perspective view of an exemplary LCD panel and a corresponding exemplary polarizing sheet in an LCD device according to a first embodiment of the present invention. As illustrated in FIG. 6, an LCD device according to the first embodiment of the present invention includes an LCD panel 100 and a polarizing sheet 110. The LCD panel 100 has a plurality of pixel regions, wherein each pixel region includes a plurality of domains 101a, 101b, 101c and 101d. The polarizing sheet 110 also has a plurality of polarizing domains 111a, 111b, 111c and 111d, wherein the plurality of polarizing domains 111a, 111b, 111c and 111d have the different light-transmitting axes (directions) that correspond to the domains 101a, 101b, 101c and 101d of the pixel region.

The LCD device according to the first embodiment of the present invention may be an HAVA (High Aperture Vertical Alignment) mode device. However, the LCD device according to the first embodiment of the present invention may be applicable to any mode having different alignment characteristics by each pixel region as well as multi-domain mode. For example, the LCD device according to the first embodiment of the present invention may be applied to an IPS (In-Plane Switching) mode device, an MVA (Multi Vertical Alignment) mode device or an HAVA (High Aperture Vertical Alignment) mode device.

The LCD panel includes a first substrate having a TFT array, a second substrate having a color filter array, and a liquid crystal 120. The first and second substrates are positioned opposite each other, and the liquid crystal 120 is formed between the first and second substrates. Also, the polarizing sheet 110 is formed on each of the lower and upper surfaces of the LCD panel 100.

Referring to FIG. 6, in the exemplary LCD device according to the first embodiment of the present invention, one pixel region of the LCD panel 100 may be divided into nine domains. In the first domain 101a, the liquid crystal is aligned in a diagonal direction crossing from the upper left corner to the lower right corner. In the second domain 101b, the liquid crystal is aligned in the vertical direction. For the third domain 101c, the liquid crystal is aligned in a diagonal direction of crossing from the lower left corner to the upper right corner. In the fourth domain 101d, the liquid crystal is aligned in the horizontal direction.

It will be readily apparent to one of ordinary skill that various numbers and configurations of domains are possible and within the scope of the invention. Further, each pixel region may have a single domain, such that different pixels may each have different domains in a manner similar to the different domains described above.

The exemplary LCD device is in a normally black mode. Accordingly, before applying the voltage, the LCD device is in a black state. After applying the voltage, the LCD device is in a white state, depending on the strength of the electric field.

The polarizing sheet 110, on which each domain has a different light-transmitting axis, compensates for the difference of the light-transmitting characteristics according to the alignment of liquid crystal 120 in each of the domains at an initial normally black state before applying the voltage.

The alignment of liquid crystal in the adjacent domains on the exemplary LCD panel 100 is twisted at an approximate angle of 45° or 90°.

In the LCD device according to the first embodiment of the present invention, the liquid crystal 120 is aligned at an angle of about 45° relative to the horizontal and vertical directions, thereby improving a viewing angle in the diagonal direction.

As described above, the liquid crystal may be aligned in a method of changing a pretilt angle, or changing a structure in a pixel electrode, a common electrode or a dielectric protrusion in the pixel region. In case of the liquid crystal domain aligned at an angle of about 45°, the light-transmitting axis of the polarizing sheet is designed at an angle of about 45° relative to the direction of the light-transmitting axis of the polarizing sheet in the domain of liquid crystal aligned in the horizontal and vertical directions. Accordingly, it is possible to obtain the wide viewing angle without contrast deterioration due to light leakage.

The polarizing sheet 110 is divided into the polarizing domains 111a, 111b, 111c and 111d having the different light-transmitting axes corresponding to the domains of the LCD panel 100. The light-transmitting axes of the respective polarizing domains 111a, 111b, 111c and 111d correspond to the alignment of liquid crystal in the corresponding domains of the LCD panel 100. Although not shown, there is a lower polarizing sheet provided below the LCD panel 100, which includes other light-transmitting axes formed at an angle of about 90° relative to the respective above-mentioned light-transmitting axes of the polarizing sheet 110.

The polarizing sheet 110 and the lower polarizing sheet are formed on the outer surfaces of the LCD panel 100. The polarizing sheet 110 and the lower polarizing sheet may be formed on the first and second substrates of the LCD panel 100.

An exemplary method for forming the polarizing sheet 110 on the outer surface of the LCD panel 100 will be described as follows.

As explained above, first and second alignment layers (not shown) are respectively formed on the first substrate of the TFT array including the thin film transistor TFT and the pixel electrode and on the second substrate of the color filter array including the common electrode. When rubbing the first and second alignment layers, the pretilt angle is applied differently to each of the domains, so that it is possible to differently align the liquid crystal in each of the domains. In another method, one pixel region may be divided into the plurality of domains by changing the shape of the pixel electrode or the common electrode in the respective TFT and color filter array fabrication processes. Accordingly, the liquid crystal is differently aligned by each of the domains.

After that, the first and second substrates are bonded to each other such that a predetermined cell gap is maintained between them, and then a liquid crystal layer is formed between the two substrates, thereby forming the LCD panel.

Then, polarizing sheets are formed on the outer surfaces of the first and second substrates of the LCD panel, to compensate for the light-transmitting characteristics in correspondence with the alignment direction of the liquid crystal in each pixel or domain. The polarizing sheet 110 may be formed on the first and second substrates of the LCD panel 100.

First, the substrate is prepared for the formation of the plurality of pixels, wherein each pixel has the plurality of domains. Subsequently, a polarizing material is coated on the entire surface of the substrates (first and second substrates of the LCD panel 100), wherein the polarizing material has the light-transmitting axis in the vertical direction (the light-transmitting axis in the second polarizing domain 111b). Then, after coating a photoresist layer on the polarizing material, an exposure and development process is performed to form a photoresist pattern in correspondence with the second domain 101b of the pixel. Then, the polarizing material is removed by using the patterned photoresist pattern as a mask, thereby forming the second polarizing domain 111b of the pixel.

After that, a polarizing material is coated on the entire surface of the substrate (first and second substrates of the LCD panel 100), wherein the polarizing material has the light-transmitting axis in the horizontal direction (the light-transmitting axis in the fourth polarizing domain 111d). Then, after coating a photoresist layer on the polarizing material, an exposure and development process is performed to form a photoresist pattern in correspondence with the fourth domain 101d or the pixel. Then, the polarizing material is removed by using the patterned photoresist pattern as a mask, thereby forming the fourth polarizing domain 111d of the pixel.

A polarizing material is coated on the entire surface of the substrate (first and second substrates of the LCD panel 100), wherein the polarizing material has the light-transmitting axis in the diagonal direction of crossing from the upper left corner to the lower right corner (the light-transmitting axis in the first polarizing domain 111a). Then, the polarizing material is selectively removed to form the first polarizing domain 111a of the pixel in correspondence with the first domain 101a of the pixel. After that, a polarizing material is coated on the entire surface of the substrate (first and second substrates of the LCD panel 100), wherein the polarizing material has the light-transmitting axis in the diagonal direction of crossing from the upper right corner to the lower left corner (the light-transmitting axis in the third polarizing domain 111c). Then, the polarizing material is selectively removed to form the third polarizing domain 111c of the pixel in correspondence with the third domain 101c of the pixel.

Accordingly, the light-transmitting axis is defined differently for each domain or pixel on the polarizing sheet 110. Then, the array process is performed on the substrate having the polarizing sheet 110 formed thereon, thereby forming the TFT array substrate having the pixel electrode, or the color filter array substrate having the common electrode, depending on the substrate.

Next, first and second alignment layers (not shown) are respectively deposited on the first and second substrates (not shown). When rubbing the first and second alignment layers, the pretilt angle is differently applied to each of the domains, so that it is possible to differently align the liquid crystal in each of the domains. In another method, one pixel region may be divided into the plurality of domains by changing the shape of the pixel electrode or the common electrode on the TFT and color filter array. Thereby, the liquid crystal is differently aligned by each of the domains.

After that, the first and second substrates are bonded to each other such that a predetermined cell gap is maintained between them, and then a liquid crystal layer is formed between the two substrates, thereby forming the LCD panel.

Figure 7:
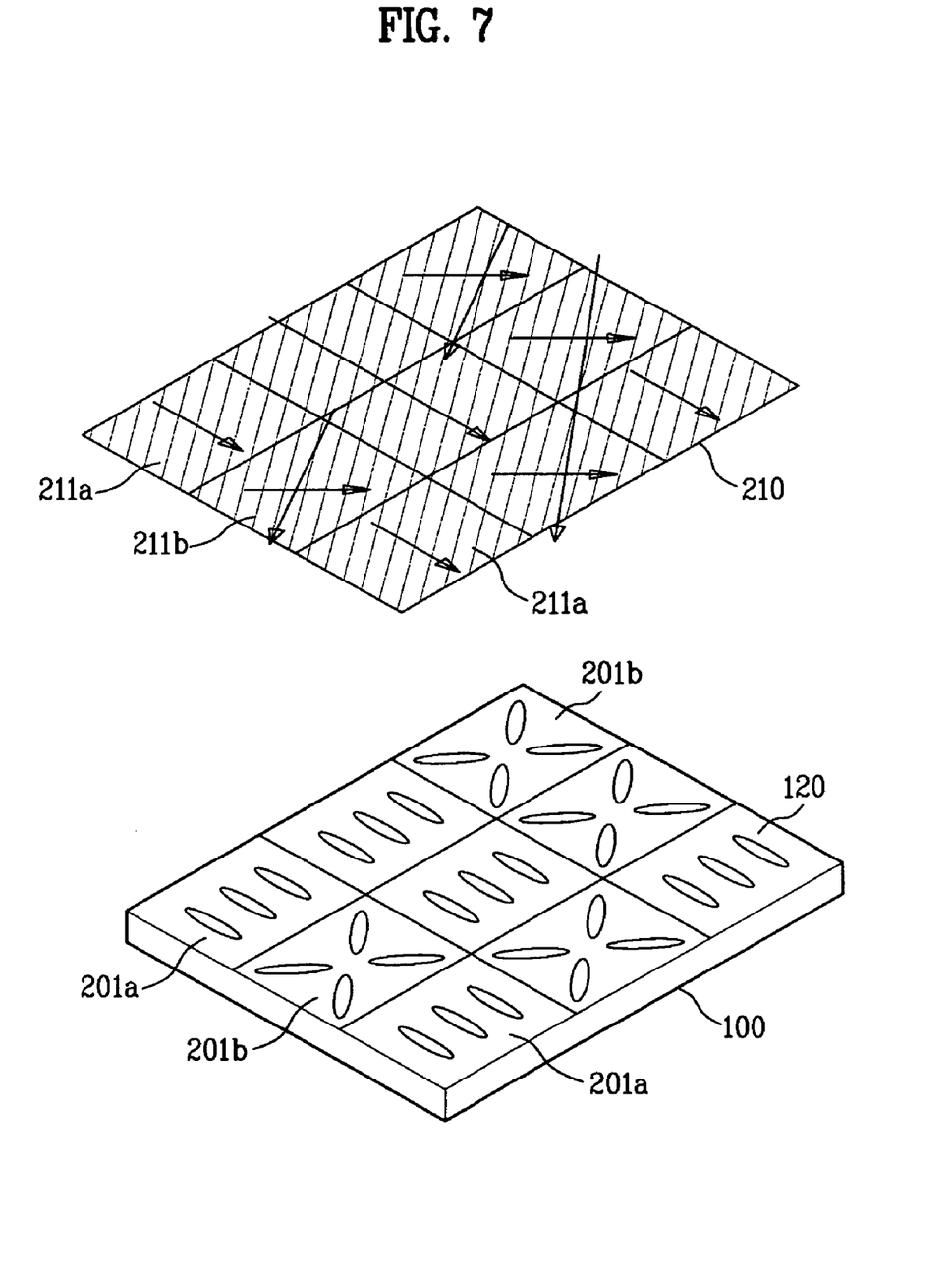
FIG. 7 is a perspective view of an exemplary LCD panel and a corresponding polarizing sheet in an LCD device according to a second embodiment of the present invention.

FIG. 7 is a perspective view of an exemplary LCD panel and a corresponding exemplary polarizing sheet in an LCD device according to a second embodiment of the present invention.

In an LCD panel of an LCD device according to the second embodiment of the present invention, as illustrated in FIG. 7, liquid crystal may be randomly aligned in the horizontal direction or the radial direction by each of domains.

In this case, a polarizing sheet 210 is formed in correspondence with the LCD panel 100, wherein the polarizing sheet 210 has first and second polarizing domains 211a and 211b. The first and second polarizing domains 211a and 211b have the different light-transmitting axes in correspondence with the respective first and second domains 201a and 201b of the LCD panel 100. FIG. 7 illustrates only one polarizing sheet 210. However, although not shown, there is another polarizing sheet provided below the LCD panel 100, which includes other light-transmitting axes formed at an angle of about 90° relative to the above-mentioned light-transmitting axes of the polarizing sheet 210.

In the exemplary LCD device according to the second embodiment of the present invention, the polarizing sheet 210 may be formed on the outer surface of the LCD panel. In another method, the polarizing sheet 210 may be formed on the inner surface (glass surface) in each of the first and second substrates, as described with respect to the first embodiment of the present invention.

In the LCD device according to the second embodiment of the present invention, the LCD panel 100 includes the domain 201b on which the liquid crystal is randomly aligned in the radial direction. Also, the polarizing domain 211b is formed on the polarizing sheet 210 to compensate for the light-transmitting characteristics of the alignment of liquid crystal by the corresponding domains.

In the above-mentioned multi-domain LCD device according to the present invention, the light-transmitting axis is defined differently for each of the domains on the polarizing sheet to compensate for the light-transmitting characteristics in correspondence with the alignment direction of the liquid crystal in each domain. Instead, a retardation film may be used for the multi-domain LCD device, wherein the retardation film has the different phase delay characteristics according to each of the domains. In this case, the retardation film may be formed on the outer surface of the LCD panel, or may be formed on each of the first and second substrates in the LCD panel.

As mentioned above, the LCD device and the method for fabricating the same according to the present invention have the following advantages.

In the LCD device according to the related art, the light-transmitting axes of the two polarizing sheets may each be positioned substantially parallel or at an angle of about 90°. On forming the LCD panel having the different alignment direction of liquid crystal by each pixel or domain, the light transmittivity is great in either the horizontal and vertical direction or the diagonal direction. Light leakage is generated in the remaining domains under the black state.

In the LCD device according to the present invention, the polarizing sheets (or compensation films) having the different light-transmitting axes are formed in the domains having the light leakage, so that it is possible to compensate for the light-transmitting characteristics in each of domains.

In the exemplary array fabrication process, the polarizing sheet or the compensation film having the different characteristics corresponding to each of the domains is formed in each of domains on the substrate of the LCD panel, so that it is possible to prevent the misalignment.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An LCD device comprising:
    an LCD panel having a plurality of pixels, wherein each pixel has a plurality of alignment domains, and each alignment domain has a liquid crystal alignment angle, wherein different alignment domains have different alignment angles; and
    a first polarizing sheet disposed on a first surface of the LCD panel, wherein the first polarizing sheet has a plurality of first polarizing domains corresponding to the plurality of alignment domains, wherein each first polarizing domain has a transmission angle that is the same as the liquid crystal alignment angle of the corresponding alignment domain, wherein the transmission angle and the liquid crystal alignment angle both have the same starting reference point.

2. The LCD device according to claim 1, further comprising a second polarizing sheet disposed on a second surface of the LCD panel, wherein the second polarizing sheet has a plurality of second polarizing domains that correspond to the first polarizing domains of the first polarizing sheet.

3. The LCD device according to claim 2, wherein each second polarizing domain has a transmission axis angle that is approximately 90° relative to the transmission angle of the corresponding polarizing domain.

4. The LCD device according to claim 1, wherein at least one of the liquid crystal alignment angles is equal to about 90°.

5. The LCD device according to claim 1, wherein at least one of the liquid crystal alignment angles is equal to about 45°.

6. The LCD device according to claim 1, further comprising a retardation film disposed between the LCD panel and the polarizing sheet.

7. The LCD device according to claim 6, wherein the retardation film has a plurality of phase delay regions corresponding to the plurality of alignment domains, and wherein each of the plurality of phase delay regions has a phase delay corresponding to the corresponding alignment domain.

8. An LCD device comprising:
    an LCD panel having a plurality of pixels, wherein each pixel has a liquid crystal alignment angle and different pixels have different liquid crystal alignment angles;
    a first polarizing sheet disposed on a first surface of the LCD panel, wherein the first polarizing sheet has a plurality of first polarizing domains corresponding to the plurality of pixels, wherein each of the first polarizing domains has a transmission angle that is the same as the liquid crystal alignment angle of the corresponding pixel, wherein the transmission angle and the liquid crystal alignment angle both have the same starting reference point.

9. The LCD device according to claim 8, further comprising a second polarizing sheet disposed on a second surface of the LCD panel, wherein the second polarizing sheet has a plurality of second polarizing domains corresponding to the first polarizing domains of the first polarizing sheet.

* * * * *